Aug. 23, 1938.         C. E. KRAUS         2,127,523
                       METAL TURNING
              Filed Jan. 9, 1937      3 Sheets-Sheet 1
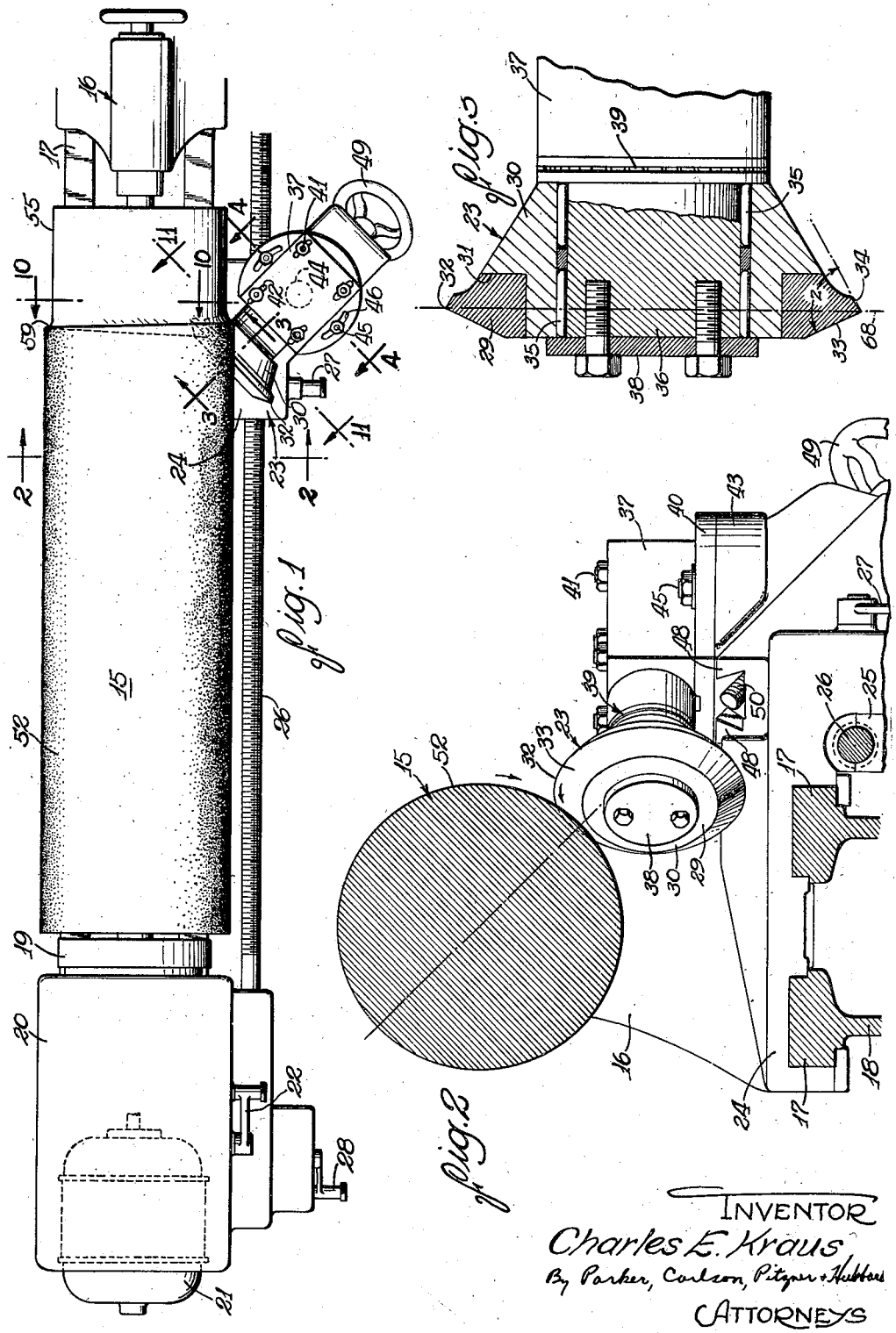
INVENTOR
Charles E. Kraus
By Parker, Carlson, Pitzner & Hubbard
ATTORNEYS

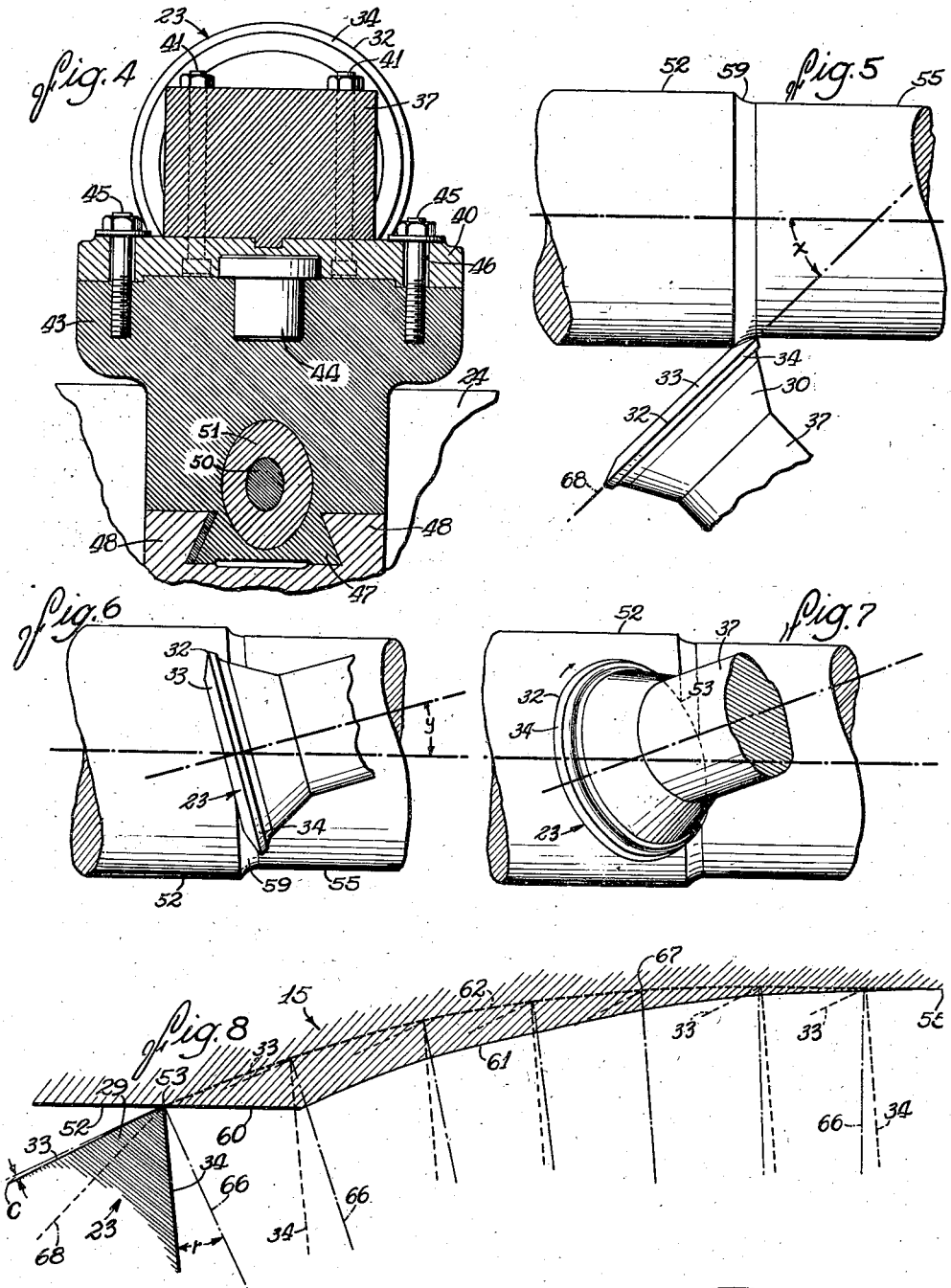

Aug. 23, 1938.  C. E. KRAUS  2,127,523
METAL TURNING
Filed Jan. 9, 1937  3 Sheets-Sheet 3
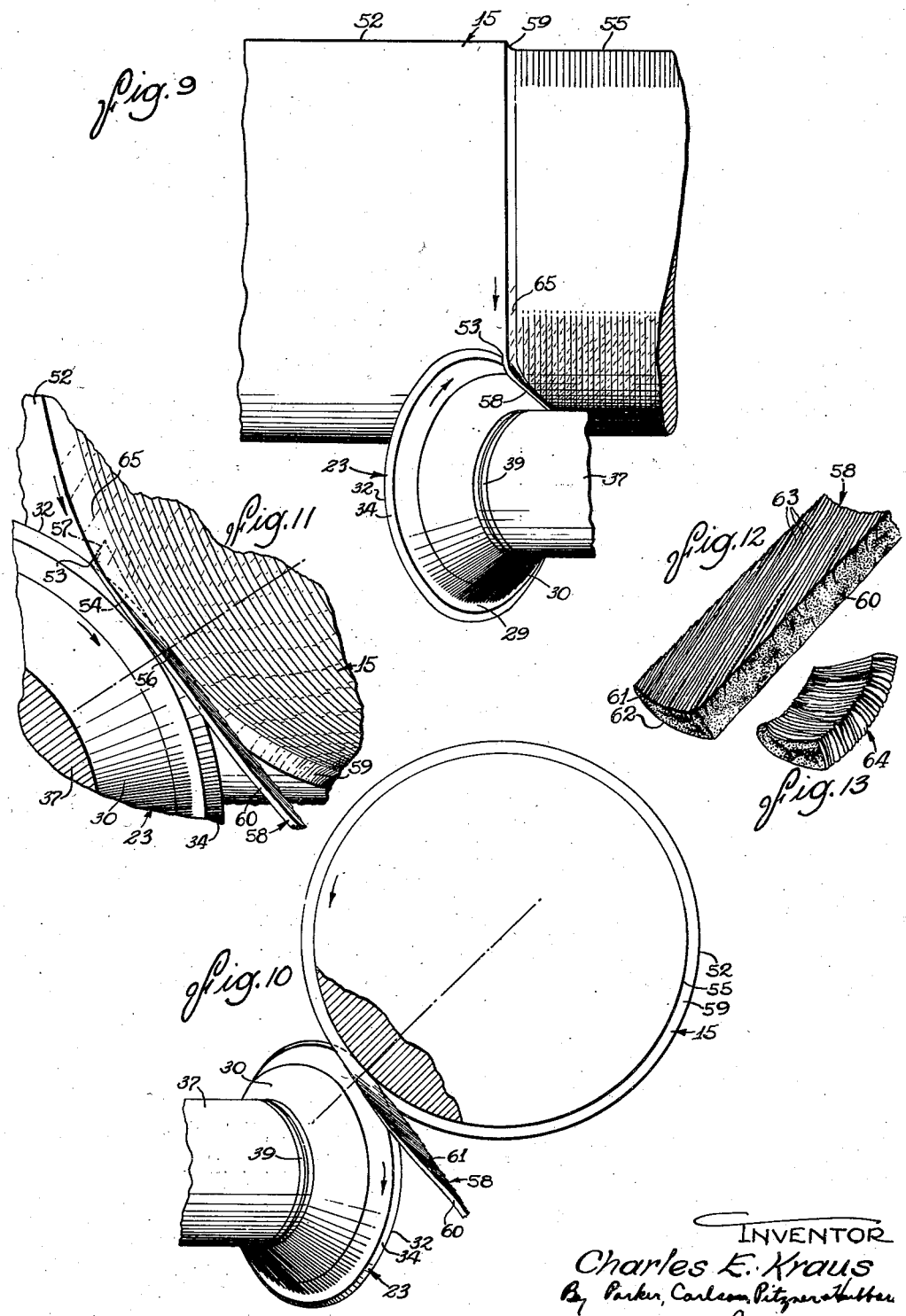
INVENTOR
Charles E. Kraus
By Parker, Carlson, Pitzner & Hubbar
ATTORNEYS Patented Aug. 23, 1938

2,127,523

UNITED STATES PATENT OFFICE 2,127,523

METAL TURNING

Charles E. Kraus, Rockford, Ill., assignor to The Ingersoll Milling Machine Company, Rockford, Ill., a corporation of Illinois Application January 9, 1937, Serial No. 119,779

38 Claims. (Cl. 82—1)

This invention relates generally to a method of and machine for metal turning, and the general object is to produce a substantial increase in the rate at which work pieces may be rough turned.

In metal turning as now practiced, the cutting edge of the tool is fixed on the traveling work carriage and acts with a constant rake angle which may be adapted for efficient cutting of the material being operated upon. With this arrangement, however, the cutting speed, that is, the rate of relative movement between the engaging parts of the work and tool, always equals and cannot be reduced below the surface speed of the work. A fixed limitation is thus imposed upon the maximum rate at which metal may be removed by turning, such rate being a function of the cutting speed.

The present invention aims to overcome the limitations above mentioned through the use of a tool which rotates automatically during the turning operation and which is arranged to reduce the cutting speed to only a small part of the peripheral speed of the work and at the same time maintain effective rake angles.

A more detailed object is to provide a novel turning method and machine of the above character in which the cutting edge of the rotating tool enters the work on the rough or uncut surface and passes out of active cutting engagement on the reduced diameter and in which the effective rake angle of a point on said edge decreases as the point progresses through the work.

A further object is to reduce the maximum chip thickness for a given depth of cut in metal turning operations and thereby provide for long service life of the cutting tool.

Another object is to construct and mount the rotary cutter in a novel manner such that the axial thrust thereon will be of small magnitude and controllable in direction.

The invention also resides in the novel construction of the cutting disk.

Other objects and advantages of the invention will become apparent from the following detailed description taken in connection with the accompanying drawings, in which Figure 1 is a fragmentary plan view of a turning machine by which the present invention may be practiced.

Figs. 2, 3 and 4 are fragmentary sectional views taken respectively along the lines 2—2, 3—3, and 4—4 of Fig. 1.

Fig. 5 is a fragmentary plan view illustrating one step in the positioning of the turning tool.

Fig. 6 is an elevational view illustrating another step in the positioning of the turning tool.

Fig. 7 is an elevational view combining the two stages illustrated in Figs. 5 and 6.

Fig. 8 is a sectional view taken through a chip and a part of the turning tool in the direction of the cutting action and illustrating the manner in which the rake angles change as the tool progresses through the work.

Fig. 9 is a fragmentary elevational view of the work piece and the cutting tool during a turning operation.

Fig. 10 is a fragmentary cross sectional view of the cutter and work piece taken along the line 10—10 of Fig. 1.

Fig. 11 is a fragmentary sectional view taken substantially along the line 11—11 of Fig. 1.

Fig. 12 is a perspective view of a portion of one of the chips formed in the metal turning operation.

Fig. 13 is a similar perspective view of a portion of a chip formed in an ordinary lathe operation.

While the invention is susceptible of various modifications and alternative constructions, I have shown in the drawings and will herein describe in detail the preferred embodiment, but it is to be understood that I do not intend to limit the invention by such disclosure but aim to cover all modifications and alternative arrangements falling within the spirit and scope of the invention as expressed in the appended claims.

Generally stated, the invention involves the use of a cutting tool in the form of a disk which has peripheral cutting and clearance surfaces converging to a cutting edge and which is mounted to rotate about a central axis during its active engagement with a rotating work piece. Said edge is angularly positioned relative to the work in a novel manner such that the cutting speed resulting from the rotation of the edge and work is measured generally transversely of the metal section being removed and therefore is only a small part of the peripheral speed of the work. The cutting edge is also positioned so that a point thereon enters the work on the uncut diameter at a rake angle adapted for efficient cutting of the thick side portion of the chip and passes out of active cutting engagement on the reduced diameter at a progressively decreased rake angle capable of properly cutting the thinner side portion of the chip.

In the present instance, such action of the cutting disk is obtained by first rotatably supporting the disk for entering the work to the desired depth with the plane of the cutting edge making at an acute angle, preferably between 30 and 60 degrees, with the rough portion of a work piece and with the disk also tilted at a smaller angle toward such uncut portion about a diameter of the edge approximately through the area of engagement of the edge with the work. Then, while the work is being rotated in a direction to carry successive peripheral portions thereof toward the cutting surface of the disk which faces away from the work, the work and disk are relatively fed in a direction to advance the clearance surface of the disk toward the uncut portion of the work.

The invention as thus generally set forth may best be practiced in a lathe type of machine tool and will for convenience be described more in detail in connection with a conventional lathe construction wherein the work rotates. Other arrangements well understood as equivalent in the machine tool art and involving similar relative motions between the cutting disk and the work may of course be employed and such arrangements are intended to be included within the scope of the appended claims. The drawings illustrating the invention in connection with the rough turning of a metal cylinder 15 while the latter is rotatably supported at one end by an axially adjustable tail stock 16 slidable along and adapted to be clamped to ways 17 on a bed 18. The other end is supported and driven by a spindle 19 on a head stock 20 which carries an electric motor 21 operating to drive the spindle through appropriate speed change and clutch mechanisms (not shown) controllable from a manually operable handle 22 or the like.

The tool or cutting disk above referred to and generally designated by the numeral 23 is mounted on a carriage 24 slidable along the bedways 17. Supported on the carriage is the usual split nut 25 encircling a lead screw 26 and arranged to engage and disengage the same according to the position of a control handle 27. The lead screw is rotatably supported by the machine bed and may be driven by the motor 21 through appropriate speed change and clutch mechanisms of well known constructions arranged for selective operation under the control of means such as an adjustable hand lever 28 to start, stop and reverse the lead screw or vary its speed of rotation. Thus, the tool carriage may be fed along the work in either direction at different selected rates. If desired, the feed screw may be driven by a separate motor and controlled in various ways well understood in the metal turning art.

In the form shown, the cutter disk 23 comprises a ring 29 of cutting material shrunk or otherwise fastened to a hub 30 in abutment with a shoulder 31 and having a radially projecting peripheral cutting edge 32 formed by the merging of frusto-conical clearance and cutting surfaces indicated at 33 and 34 and respectively disposed on opposite sides of the plane of the edge for the purpose of controlling the direction of the forces applied to the cutter as will appear later. The included angle z between the surfaces 33 and 34 is of course governed by the character of the material being operated, being approximately 70 degrees in the present instance.

The hub 30 which is of substantial axial length is supported as by roller bearings 35 to rotate freely on a stud 36 rigid with and projecting from a block 37 which constitutes the tool shank. A plate 38 clamped against the end of the stud 36 overlaps the hub and holds the cutter disk thereon.

Suitable bearings 39 sustain the slight axial thrust which is exerted on the disk.

Preferably, though not necessarily, the disk 23 is mounted on the tool carriage with its axis disposed horizontally and, for reasons to appear later, provision is made for adjusting the position of the disk relative to the work to determine the depth of cut and the angular position of the disk as may be desirable under different conditions. To these ends, the block 37 is herein clamped against a turn table 40 by bolts 41 extending through slots 42 which are elongated in the direction of the disk axis. Provision is thus made for axial adjustment of the disk. The table rests on a slide 43 and is adapted to turn thereon about a vertical pivot pin 44 whereby to permit of variation in the angle at which the plane of the cutting edge intersects the work. After such adjustment, the table and slide are rigidly clamped together by bolts 45 projecting through arcuate slots 46 in flanges of the table and anchored in the slide 43.

The lower side of the slide is formed with an inclined tongue 47 received in dove-tailed ways 48 on the tool carriage 24. The ways are alined approximately with a radius (see Fig. 2) of the work through the area of engagement with the tool and the work so as to permit bodily shifting of the disk toward and away from the work while maintaining the rotational axis of the disk in horizontal position. Such shifting may be effected by turning a hand wheel 49 to rotate a screw 50 on the carriage 24 meshing with a nut 51 on the slide 43.

The preferred angular position of the disk relative to the work may best be visualized by considering the plane of the cutting edge, as being tilted in two stages about transverse axes as illustrated separately in Figs. 5 and 6. Starting with the axes of the work and disk disposed in a common horizontal plane, the tool shank or block 37 is first swung horizontally away from the work about the area of peripheral engagement with the work so as to face the cutting surface 34 away from the work. The plane of the cutting edge 32 is thus disposed relative to the rough or uncut portion 52 of the work piece at an angle $x$ which may vary substantially depending on the depth of the cut to be taken, the rake angle to be provided, and the angular relation of the cutting and clearance surfaces 33 and 34 relative to the plane of the cutting disk. With the disk constructed as shown, the angle $x$ is preferably about 45 degrees although this may vary within a substantial range, for example from 30 to 60 degrees with cutting disks of the type shown.

The other stage separately illustrated in Fig. 6 consists in tilting the disk from the position first assumed about a diameter of the cutting edge extending approximately through the area of peripheral engagement between the edge and the work until the axis is disposed at a comparatively small angle $y$, for example 15 degrees, relative to a horizonal plane through the work axis, that is, a diametrical plane of the work through the area of engagement between the disk and the work. As will appear later, this angle is the main factor determining the ratio of cutting speed to the surface speed of the work.

When the second stage of tilting is combined with the first, the ellipse of intersection between the plane of the cutting edge 32 and the work is further enlarged and the cutting edge becomes positioned as shown in Fig. 7. The cutter disk will operate properly when thus positioned relative to the work, but it is preferred to revolve the disk and its mounting about the work axis in the direction of work rotation so as to bring the cutter axis into a horizontal plane as shown in Figs. 1, 2, 9, and 10, the area of intersection of the cutter and work then being substantially below a horizontal plane through the work. This results in a more advantageous distribution to the bed ways 17 of the forces exerted on the tool carriage during turning.

Variation in the inclination of the cutting edge from the exemplary position above described may be effected by adjusting the disk mounting. Thus, the angle $x$ included between the plane of the edge 32 and the uncut portion 52 of the work may be changed by swinging the block about the pivot 44. The angle $y$ may be changed by shifting the disk axially and turning the hand wheel 49 to position the disk for depth in the new axial position.

In carrying out the present invention, the directions of work rotation and relative feed between the work and cutter are correlated with the angular position of the disk. Thus, with the cutter disk positioned as above described, the work is rotated as indicated by the arrows in Figs. 2, 9, 10, and 11, that is, in a direction to carry successive peripheral portions of the work downwardly and toward the cutting surface 34 of the disk. Simultaneously, the tool carriage 24 is fed horizontally as indicated, that is, to the left as viewed in Figs. 1 and 9 so as to advance the clearance surface 33 of the cutter toward the uncut portion 52 of the work.

Preparatory to turning a work piece after mounting thereof in the typical lathe structure above described, the tool carriage is moved beyond the right hand end of the work, and by adjustment of the hand wheel 49, the cutter is set inwardly according to the depth of the cut to be taken. As the cutter engages the rotating work piece in the initial feeding movement, the work applies a force acting on the cutter disk in a direction offset from the disk axis thereby causing the disk to rotate clockwise as indicated by the arrows in Figs. 9 and 10. During such rotation, a point on the cutting edge will enter the work on the uncut surface 52 as indicated at 53, and after traversing a curved path 54 through the work, will pass out of active cutting engagement on the cut or turned surface 55 at a point 56 circumferentially spaced from the point 53 of entry in the direction of work rotation as shown in Fig. 11. Thus, the arcuate portion of the cutting edge which at any time intersects the work is of substantial length owing to the angle $x$ and is positioned for effective cutting of the metal advancing toward such portion. As a result of the combined movements of the work and cutting edge in the directions indicated, the active edge portion is forced into the work so that a point thereon moves relative to the work along a line 57 (Fig. 11) which represents the resultant direction in which the cutting action occurs, this being transversely of the chip formed and generally opposite to the direction of feed of the tool carriage. A continuous helical ribbon or chip 58 (Figs. 9 to 11) is thus severed from the periphery of the work piece leaving a surface 59 of concave cross-section which tapers abruptly from the rough portion 52 of the work and gradually merges with the turned portion 55. While the chip actually flows transversely across the active portion of the cutting edge 32 and the cutting surface 34, the chip, after complete severance, leaves the cutting surface in a direction substantially tangential to the disk (see Figs. 10 and 11).

As shown in Fig. 12, the chip 58 is generally triangular in cross-sectional shape having an uncut surface 60 on the thick side of the chip equal in width to the feed per revolution of the work. The concave and convex side surfaces 61 and 62 which are cut in successive revolutions of the work taper toward each other and intersect to define the thin edge of the chip. Owing to the fact that the direction of the cut is substantially transverse to the chip being formed, the length of the latter corresponds approximately to the length of the metal section removed from the work. There is some lateral compacting of the chip as indicated by the wrinkles 63 which extend generally longitudinally of the chip. This is a characteristic by which the chip is distinguished from ordinary lathe chips 64 which, as shown in Fig. 13, are compacted longitudinally and are of different and larger cross-sectional shape than the metal sections from which they are formed.

The direction of the cut taken by the edge 32 is also indicated by fine cutter marks 65 on the work surface 59. Also, this direction may be determined from the inclination of the wrinkles 63 formed on the chip.

By employing a moving cutting edge which acts on the work in the direction transversely of the direction of work movement, the effective cutting speed, that is, the rate of relative movement between the tool and the work is reduced to a small part, approximately one-fourth in the present instance, of the surface speed of the work. This is due to the fact that in traversing the arc of contact between the work and the cutting edge 32, a point on the latter moves relative to the work a comparatively shorter distance, that is, the width of the surface 59. The ratio between cutting and peripheral speeds is determined mainly by the angle $y$ above described. If the small amount of slippage between the work and the cutting edge 32 is disregarded, the cutting speed may be computed for different angles of the cutter, being approximately equal to the sine of the angle $y$ multiplied by the surface speed of the work.

It will be seen from the foregoing that by changing the direction in which the cut is taken through the use of a cutting edge which moves relative to the tool carriage automatically during the turning operation, it has been possible to effect a substantial reduction in the effective cutting speed. A corresponding reduction is thus obtained in the burden on the cutting edge, which burden is a function of the cutting speed. The feed rate and therefore the rate of metal removal may thus be increased to values several times greater than those obtained in present metal turning practice. The use of a moving cutting edge is also advantageous in that the effective length of the edge is increased many times as compared to present lathe tools. Thus, the disk provides a substantial volume of metal for conducting heat away from the edge 32 from which heat may also radiate while portions of the edge are out of active engagement with the work.

The desired cutting action above described may be obtained with cutting disks of widely varying sizes, it being desirable to employ as large a disk as practicable. This is for the reason that with a larger disk, a more rugged mounting may be provided, deeper cuts may be taken, and the life of the cutting edge may be prolonged.

The use of a moving cutting edge for the purpose of reducing the cutting speed below the surface speed of the work necessarily results in a change in the effective rake angle at which a point on the cutting edge acts as it progresses through the work. With the cutter arrangement above described, however, the rake angles which are effective at different points on the chip, the direction in which the angles change and the amount of the change are all such as to provide for efficient cutting. Thus, the rake angle for a given point on the cutting edge is greatest on the thick side portion of the chip where the most favorable rake angle is desirable. The angle decreases as the point progresses across the cut surface, but the angles which are effective while the thin side of the chip is being severed from the work are nevertheless of sufficient magnitude to produce efficient cutting action.

By varying the construction of the cutting disk or the angle $x$ which it makes with the rough portion of the work, the maximum rake angle which obtains at the point 53 of entry and the rate of change of the rake angle may be controlled and thus adapted to the kind of material being turned and the depth of cut being taken. In this way, the detrimental effect of the inherent change in the rake angle resulting from the use of a rotary cutting disk is reduced to a minimum thereby permitting the reduced cutting speed to be utilized to full advantage in increasing the rate of metal removal.

The term rake angle is used herein to refer to what is known in practice as the true rake angle, that is to say, the angle $r$ (Fig. 8) which the cutting surface 34 makes with a line 66 perpendicular to the work surface being formed in the direction of the cut. In the present instance, the rake angle at the point 53 of entry would be measured in the general direction of the line 57 (Fig. 11).

The progressive change in the effective rake angle for a point on the cutting edge as the latter moves through the work is of course governed by the curvature of the surfaces 59 and 62 which in turn depends on the depth of cut being taken and the angle $x$ at which the cutting edge 32 is disposed relative to the rough portion 52 of the work. Thus, if the material to be turned is cast iron or medium steel, the rake angle at the point of tool entry is preferably somewhat larger, for example 20 degrees, than that ordinarily used in cutting such material, the purpose being to provide the most effective rake angles, for example 7 to 15 degrees, in the thickest portion of the chip. As illustrated in Fig. 8, the rake angle may change to a negative value at the point 67 substantially across the chip and then continually increase as a negative value to the thin edge of the chip. It will be seen that the major portion of the chip area is cut while the rake angle is positive and before the latter has been reduced to a value too small for efficient cutting of a thick layer of metal. Of course, the negative angles which may develop on the thin side of the chip are not conducive to the formation of a smooth finished surface but may be employed satisfactorily owing to the thinness of that portion of the chip being formed where these angles occur. Thus the present invention is primarily intended for rough turning operations where a high rate of metal removal is the object in view.

The invention also contemplates a special construction and positioning of the cutter disk for the purpose of reducing the end thrust on the disk to a relatively small value which thrust acts in the direction of the thrust bearing 39. To this end, the cutting and clearance surfaces 33 and 34 are formed on opposite sides of the plane 68 through the cutting edge 32, and the cutting surface is disposed relative to this plane and the disk as a whole positioned so as to control the applied forces in the desired way. The included angle between the surfaces 33 and 34 is of course determined by the kind of work material to be operated upon thereby establishing the direction relative to the cutting face in which the force applied by the work during turning will act. This being known, the cutting surface is then located relative to the plane of the cutting edge so that the resultant force applied by the work will be inclined slightly to the plane 68 in a direction away from the work. Thus, the major component of the force exerted on the cutter by the work will be directed radially so that the total force is capable of being distributed more advantageously to the bed ways. By providing a relatively small axial component directed toward the thrust bearing 39, creeping of the disk 23 and axial play of the cutting edge 32 are prevented and the construction of the thrust bearing simplified. The possibility of axial thrust being exerted on the plate 38 is also prevented. The arrangement of the cutting and clearance surfaces on opposite sides of the plane of the cutting edge 32 is also advantageous in that greater latitude is allowed in the location of the cutting surface for the purpose of controlling the maximum rake angle. Of course, the position of the surface 33 is such that in any case adequate clearance $c$ (Fig. 8) between this surface and the work will be provided.

The rotary cutting tool operating in the manner above described has a further beneficial effect and contributes in another way to the increased rate at which metal may be removed in accordance with the present invention. Thus, it will be apparent that the sections of metal removed from the work by the cutting disk are comparatively wider and the angle between the uncut and the convex surfaces 60 and 62 of the chip is smaller than in the chips removed by ordinary lathe tools. As a result, the maximum thickness of the chips is less and the burden on the cutting edge is reduced accordingly thereby enabling a further increase in the feed rate to be obtained.

I claim as my invention:

1. A metal turning machine having, in combination, means supporting a work piece for rotation on a horizontal longitudinal axis, a cutter disk having oppositely facing cutting and clearance surfaces converging to a circular peripheral cutting edge, means supporting said disk to rotate freely about a horizontal axis disposed below the work axis at an obtuse angle relative to the unfinished part of the work so as to face said cutting surface away from the work with an arcuate portion of said cutting edge intersecting the periphery of the work piece, power driven means for rotating said work piece to advance successive peripheral portions of the work toward said cutting surface whereby to cause rotation of said disk in a direction to advance successive points on said edge through the work from a point of entry on the uncut diameter of the work, and means for relatively feeding said work piece and said disk supporting means longitudinally of the work in the direction in which said clearance surface faces.

2. A metal turning machine having, in combination, means for supporting a work piece and rotating the same on a horizontal longitudinal axis, a cutter disk having a circular cutting edge, means rotatably supporting said disk to turn about a generally horizontal axis offset below the work axis and extending transversely thereof at an acute angle, said disk being positioned for intersection with the periphery of the work, power driven means for rotating the work for imparting rotational movement to said disk in a direction to advance successive points on said edge through the work from a point of entry on the uncut diameter thereof, and means for relatively feeding said disk supporting means and the work longitudinally of the latter in a direction generally opposite to the movement of the active portion of said cutting edge.

3. A metal turning machine having, in combination, means supporting a work piece for rotation on a longitudinal axis, a cutter disk having oppositely facing cutting and clearance surfaces converging to a circular radially projecting peripheral cutting edge, said surfaces being disposed on opposite sides of the plane of said edge, means supporting said disk to rotate freely and with a portion of said edge intersecting the work and with said cutting surface facing away from the work, the disk axis extending transversely of the work axis and also being disposed at an acute angle ranging from thirty to sixty degrees and also being disposed at a smaller angle to a diametrical plane of the work through the area of intersection of the work and said edge, power driven means for rotating said work piece to advance successive peripheral portions of the work toward said cutting surface whereby to cause rotation of said disk in a direction to advance successive points on said edge through the work from a point of entry on the uncut diameter, and means for relatively feeding said work piece and said disk supporting means longitudinally of the work in the direction in which said clearance surface faces.

4. A metal turning machine having, in combination, means supporting a work piece for rotation on a longitudinal axis, a cutter disk having oppositely facing cutting and clearance surfaces converging to a circular peripheral cutting edge, means supporting said disk to rotate freely and with a portion of said edge intersecting the work and with the plane of the edge disposed at an acute angle to the uncut portion of the work and with said plane also tilted at a small angle about a diameter of the disk approximately through the area of intersection of the work and said edge, power driven means for rotating said work piece to advance successive peripheral portions of the work toward said cutting surface whereby to cause rotation of said disk in a direction to advance successive points on said edge through the work from a point of entry on the uncut diameter, and means for relatively feeding said work piece and said disk supporting means longitudinally of the work in the direction in which said clearance surface faces.

5. A metal turning machine having, in combination, means supporting a work piece for rotation on a longitudinal axis, a cutter disk having oppositely facing cutting and clearance surfaces converging to a circular peripheral cutting edge, means supporting said disk to rotate freely and with a portion of said edge intersecting the work and with said cutting surface facing away from the work, the disk axis extending transversely of the work axis and extending at a small angle of approximately fifteen degrees to a diametrical plane of the work through the area of intersection of the work and said edge, power driven means for rotating said work piece to advance successive peripheral portions of the work toward said cutting surface whereby to cause rotation of said disk in a direction to advance successive points on said edge through the work from a point of entry on the uncut diameter, and means for relatively feeding said work piece and said disk supporting means longitudinally of the work in the direction in which said clearance surface faces.

6. A metal turning machine having, in combination, means supporting a work piece for rotation on a longitudinal axis, a cutter disk having oppositely facing cutting and clearance surfaces converging to a circular peripheral cutting edge, means rotatably supporting said disk with said edge intersecting the work and with the plane of the edge disposed at an angle relative to the unfinished part of the work so as to face said cutting surface away from the work, the axis of said edge also being inclined relative to a diametrical plane of the work extending through the area of intersection between the work and the edge, power driven means for rotating said work piece to advance successive peripheral portions of the work toward said cutting face whereby to cause rotation of said disk in a direction to advance successive points on said edge through the work in a direction from a point of entry on the uncut diameter, and means for relatively feeding said work piece and said disk supporting means longitudinally of the work in the direction in which said clearance surface faces.

7. A metal turning machine having, in combination, means supporting a work piece for rotation on a longitudinal axis, a cutter disk having oppositely facing cutting and clearance surfaces converging to a circular peripheral cutting edge, means supporting said disk to rotate freely and with a portion of said edge intersecting the work and with said cutting surface facing away from the work, the plane of said disk being disposed at other than a right angle to the uncut surface of the work and the disk axis being disposed at an angle to a diametrical plane of the work through the area of intersection of the work and said edge, power driven means for rotating said work piece to advance successive peripheral portions of the work toward said cutting surface whereby to cause rotation of said disk in a direction to advance successive points on said edge through the work from a point of entry on the uncut diameter, and means for relatively feeding said work piece and said disk supporting means longitudinally of the work in the direction in which said clearance surface faces.

8. A metal turning machine having, in combination, a cutter disk having a circular peripheral cutting edge, means supporting a work piece and relatively rotating the same and said disk on a longitudinal axis of the work, means rotatably supporting said disk with said edge intersecting the periphery of the work piece and with said disk tilted about two transverse axes through the area of intersection whereby to position said edge for entering the work on the uncut diameter and to pass out of active engagement at a point spaced circumferentially in the direction of said relative rotation, the disk being rotated about its axis by such relative rotation between the disk and the work, and means for relatively feeding said work piece and said disk supporting means longitudinally of the work to present a helical part of the work piece to the active portion of said edge.

9. A metal turning machine having, in combination, means for supporting a work piece and rotating the same on a horizontal longitudinal axis, a cutter disk having a circular cutting edge, a tool shank supporting said disk to turn about its central axis which is disposed horizontally below the level of the work axis and at an obtuse angle relative to the unfinished part of the work, means supporting said shank for bodily movement axially of said disk and also radially of the work and for pivotal movement about a vertical axis spaced from the disk, said disk being adjusted for intersection with the periphery of the work piece, and means for relatively feeding said work piece and disk longitudinally of the former.

10. A metal turning machine having, in combination, means for supporting a work piece and rotating the same on a longitudinal axis, a cutter disk having a circular cutting edge intersecting the periphery of the work piece and disposed in a plane making an acute angle with the work axis, the cutter axis being inclined relative to a diametrical plane of the work through the area of cutter intersection, means rotatably supporting said disk for bodily axial movement, for movement radially of the work, and for pivotal movement about an axis spaced from the disk and extending substantially perpendicular to the disk axis, and means for relatively feeding said work piece and disk longitudinally of the former.

11. A metal turning machine having, in combination, means for supporting a work piece and rotating the same on a longitudinal axis, a cutter disk having a circular cutting edge intersecting the periphery of the work piece, means rotatably supporting said disk for bodily movement toward and away from the work axis and also for axial movement, and means for relatively feeding said work piece and disk longitudinally of the former.

12. A metal turning machine having, in combination, means for supporting a work piece and rotating the same on a longitudinal axis, a cutter disk having a circular cutting edge intersecting the periphery of the work piece and disposed in a plane making an acute angle with the work axis, means rotatably supporting said disk for pivotal movement about an axis extending transversely of the disk axis and spaced from the side of the disk opposite the work piece, and means for relatively feeding said work piece and disk longitudinally of the former.

13. A metal turning machine having, in combination, means supporting a work piece for rotation on a longitudinal axis, a cutter disk having oppositely facing cutting and clearance surfaces converging to a circular peripheral cutting edge, means rotatably supporting said disk with said edge intersecting the work at effective rake angles which decrease progressively from a point of entry on the uncut diameter of the work to a point of emergence on the reduced diameter circumferentially spaced from the point of entry in the direction of work rotation, power driven means for rotating said work piece to advance successive peripheral portions of the work toward said cutting surface and cause rotation of said disk in a direction to move successive points on said edge through the work in a direction from said point of entry at an effective cutting speed substantially less than the peripheral speed of the work, and means for relatively feeding said work piece and said disk supporting means longitudinally of the work in the direction in which said clearance surface faces.

14. A metal turning machine having, in combination, means supporting a work piece and rotating the same on a longitudinal axis, a cutter disk having a circular peripheral cutting edge, means supporting said disk for rotation by the work to produce a resultant cutting speed substantially less than the surface speed of the work and effective rake angles which decrease as each point on said edge progresses through the work, and means for relatively feeding said work piece and said disk supporting means longitudinally of the work to present a helical part of the work piece to the active portion of said edge.

15. A metal turning machine having, in combination, means supporting a work piece for rotation on a longitudinal axis, a cutter disk having oppositely facing cutting and clearance surfaces converging to a circular peripheral cutting edge, means rotatably supporting said disk with said edge intersecting the work at effective rake angles which decrease progressively from a point of entry on the uncut diameter of the work to a point of emergence on the reduced diameter, power driven means for rotating said work piece to advance successive peripheral portions of the work toward said cutting surface and cause rotation of said disk in a direction to move successive points on said edge through the work in a direction from said point of entry, and means for relatively feeding said work piece and said disk supporting means longitudinally of the work in the direction in which said clearance surface faces.

16. A metal turning machine having, in combination, means supporting a work piece and rotating the same on a longitudinal axis, a cutter disk having a circular peripheral cutting edge, means rotatably supporting said disk with said edge intersecting the work at effective rake angles which decrease progressively from a point of entry on the uncut diameter of the work to a point of emergence on the reduced diameter circumferentially spaced from said point of entry in the direction of work rotation, and means for relatively feeding said work piece and said disk supporting means longitudinally of the work.

17. A metal turning machine having, in combination, means supporting a work piece and rotating the same on a longitudinal axis, a cutter disk having a circular peripheral cutting edge, means supporting said disk with said edge intersecting the work at an angle such that said edge passes through the work from a point of entry on the uncut diameter thereof, the disk being rotated by the work to produce a resultant cutting speed substantially less than the surface speed of the work, and means for relatively feeding said work piece and said disk supporting means longitudinally of the work to present a helical part of the work piece to the active portion of said edge.

18. A metal turning machine having, in combination, means supporting a work piece and rotating the same on a longitudinal axis, a cutter disk having a circular peripheral cutting edge, means supporting said disk with said edge intersecting the work at an angle such that said edge enters the work at a point on the uncut diameter and passes out of active engagement on the reduced diameter, said disk thereby positioned for rotation by the work to produce a resultant cutting speed less than half the surface speed of the work, and means for relatively feeding said work piece and said disk supporting means longitudinally of the work to present a helical part of the work piece to the active portion of said edge.

19. A metal turning machine having, in combination, a cutter disk having a circular peripheral cutting edge, means supporting a work piece and said disk and relatively rotating the same about a longitudinal axis of the work, means supporting said disk to rotate freely about its axis with a portion of said edge intersecting the periphery of the work and rotated thereby in a direction to advance successive points on the edge through the work from the uncut diameter to points on the reduced diameter spaced from the points of entry in the direction of said relative rotation, and means for relatively feeding said work piece and said disk supporting means longitudinally of the work in the direction generally opposite to the movement of the active portion of said cutting edge.

20. A metal turning machine having, in combination, means supporting a work piece and rotating the same on a longitudinal axis, a cutter disk having a circular peripheral cutting edge, means supporting said disk with a portion of said edge intersecting the work and for automatic rotation by the work so as to form a chip which is compacted in a direction generally transversely of its length, said cutter rotation being in a direction to advance successive points on said edge through the work from a point of entry on the uncut diameter thereof, and means for relatively feeding said work piece and said disk supporting means to present a helical part of the work to the active portion of said edge.

21. A metal turning machine having, in combination, a cutter disk having cutting and clearance surfaces converging to a circular peripheral cutting edge and disposed on opposite sides of a plane including said edge, means supporting said work piece and disk for relative rotation about the work axis, means rotatably supporting said disk with said edge intersecting the work for rotation of the disk thereby about the disk axis, the inclination of said cutting surface relative to the plane of said edge being such that the resultant force applied to said disk is directed substantially longitudinally of said plane whereby to reduce the axial thrust on said disk to a small value directed transversely of and away from the work piece.

22. A metal turning machine having, in combination, means supporting a work piece and rotating the same on a longitudinal axis, a cutter disk having cutting and clearance surfaces converging to a circular peripheral cutting edge and disposed on opposite sides of a plane including said edge, means rotatably supporting said disk with said edge intersecting the work for rotation thereby, the inclination of said cutting surface relative to the plane of said edge being such that the resultant force applied to said disk is directed substantially longitudinally of said plane, and means for relatively feeding said work piece and said disk supporting means longitudinally of the work in the direction in which said clearance surface faces.

23. A rotary turning tool comprising a circular body having peripheral clearance and cutting surfaces of frusto-conical shape converging to a circular edge and disposed on opposite sides of the plane of said edge.

24. A rotary turning tool comprising a circular body having peripheral clearance and cutting faces intersecting at an included angle correlated with the material to be turned, said faces being disposed on opposite sides of a plane through the edge defined by the circle of intersection of said faces.

25. For use with a rotary disk having oppositely facing cutting and clearance surfaces converging to a cutting edge, the method of turning a cylindrical surface on a work piece which comprises supporting the work piece for rotation about its longitudinal axis, rotatably supporting said disk in peripheral engagement with said work piece with the plane of said edge disposed at an angle between sixty and thirty degrees relative to the unfinished surface of the work piece and with the disk tilted at a small angle about a diameter of the disk approximately through the area of intersection of the work and said edge, rotating the work piece in a direction to carry successive peripheral portions thereof toward the cutting surface of said disk and relatively feeding the work and disk to advance the unfinished portion of the work toward said clearance surface past said cutting edge.

26. For use with a rotary disk having cutting and clearance surfaces converging to a cutting edge, the method of turning a cylindrical surface on a work piece which comprises supporting the work piece for rotation about its longitudinal axis, rotatably supporting said disk in intersecting relation to the periphery of said work piece with the plane of said edge disposed at an acute angle relative to the unfinished surface of the work piece and with the disk axis inclined at a small angle to a diametrical plane of the work through the area of intersection of the work and said edge, rotating the work piece in a direction to carry successive peripheral portions thereof toward the cutting surface of said disk and relatively feeding the work and disk to move the unfinished portion of the work toward said clearance surface past said cutting edge.

27. For use with a rotary disk having cutting and clearance surfaces converging to a cutting edge, the method of turning a cylindrical surface on a work piece which comprises supporting the work piece and said disk for relative rotation about the work axis, rotatably supporting said disk with said edge intersecting the periphery of said work piece, with the plane of said edge tilted in one direction about the area of intersection so as to make an angle other than a right angle relative to the unfinished surface of the work piece and with the disk tilted in a direction generally transverse to said first direction, relatively rotating the work piece and said disk in a direction to carry successive peripheral portions of the work toward the cutting surface of said disk, and relatively feeding the work and disk to move the unfinished portion of the work toward said clearance surface past said cutting edge.

28. The method of turning a metal work piece which comprises the steps of rotating the work piece and subjecting a helically extending part of the work periphery to the action of a freely rotatable circular cutting edge rotated by the work in a direction to advance portions of said edge through the work from a point on the uncut diameter to points on the reduced diameter spaced circumferentially from said points of entry in the direction of said rotation whereby to produce relative cutting movement at a speed less than the peripheral speed of the work piece and in a resultant direction transverse to the work movement.

29. The method of turning metal which comprises rotating the work, subjecting the work while rotating to the action of a rotatable circular cutting edge intersecting the work from the uncut diameter thereof to points on the reduced diameter circumferentially spaced from the points of entry in the direction of work rotation, and rotating said edge to produce relative cutting movement between said edge and the work at a resultant speed substantially less than the surface speed of the work.

30. The method of metal turning which comprises rotating a piece of work on its longitudinal axis, producing relative feeding movement between the work and a circular cutting edge which actively intersects the work from a point on the uncut surface to a point on the reduced diameter spaced from said first point in the direction of work rotation, and rotating said edge during engagement with the work to advance successive portions of the edge through the work from said first to said second mentioned points and at an effective cutting speed substantially less than the peripheral speed of the work.

31. The method of turning metal which comprises relatively rotating a work piece and a freely rotatable cutting edge about the longitudinal axis of the work piece, arranging said edge with a portion of its periphery intersecting said work piece with the plane of said edge tilted about two transversely extending axes through the area of intersection whereby to cause rotation of said edge by said relative rotation in a direction to advance a point on the edge through the work from a point of entry on the uncut diameter thereof and at a resultant speed which is a small part of the peripheral speed of said relative rotation, and relatively feeding the rotating edge and work piece longitudinally of the latter.

32. The method of turning metal which comprises the steps of rotating the work and subjecting the work while rotating to the action of a rotating circular cutting edge positioned to advance through the work from points on the uncut diameter thereof and passes out of cutting engagement at points on the reduced diameter circumferentially spaced from the points of entry in the direction of work rotation and to act at effective rake angles that decrease progressively from said points of entry to the points of emergence.

33. The method of turning metal which comprises rotating a piece of work on its longitudinal axis, subjecting the periphery of said piece to the action of a rotatable circular edge having an an effective direction of cut extending transversely of the direction of work movement, and progressively decreasing the effective rake angle of a point on said edge as it progresses from a point on the uncut diameter of the work to a point on the reduced diameter thereof.

34. The method of turning metal which comprises rotating the work, subjecting the work while rotating to the action of a rotatable circular cutting edge acting at effective rake angles which decrease progressively from the thick to the thin sides of the chip being formed, and rotating said edge to produce cutting of the metal at a resultant speed which is less than half the peripheral speed of the work.

35. The method of turning metal which comprises rotating the work, positioning a circular cutting edge for intersection with the work and rotation thereby to advance peripheral portions of the edge through the rotating work from a point on the uncut diameter to a point on the reduced diameter in a resultant direction transverse to the work movement whereby to produce cutting action at an effective speed which is a small part of the peripheral speed of the work, and relatively feeding the rotating edge and work in a direction longitudinally of the latter and generally opposite to said first mentioned direction.

36. The method of turning metal which comprises the steps of rotating the work and subjecting the work while rotating to the action of a rotating circular cutting edge acting at effective rake angles which decrease progressively as a point on said edge progresses through its active engagement with the work starting at a point on the uncut diameter thereof.

37. The method of turning metal which comprises rotating a piece of work to be turned, moving a cutting edge through the rotating work from a point of entry on the uncut diameter to a point on the reduced diameter at an effective cutting speed which is a small part of the surface speed of the work, and relatively feeding the moving edge and the rotating work in a direction longitudinally of the latter.

38. The method of metal turning which comprises relatively rotating a piece of work and a circular cutting edge about the longitudinal axis of the work piece, producing relative feeding movement between the work and said edge which actively intersects the work from a point on the uncut work surface to a point on the reduced diameter circumferentially spaced in the direction of such relative rotation from said first point, and rotating said edge during engagement with the work to advance successive portions of the edge through the work from said first to said second mentioned points.

CHARLES E. KRAUS.